US010609175B2

(12) United States Patent
Su et al.

(10) Patent No.: US 10,609,175 B2
(45) Date of Patent: Mar. 31, 2020

(54) APPARATUS AND METHOD FOR BROADCAST/MULTICAST CONTENT DELIVERY AND OPPORTUNISTIC CACHING IN A BROADBAND COMMUNICATIONS NETWORK

(71) Applicant: Hughes Network Systems, LLC, Germantown, MD (US)

(72) Inventors: Chi-Jiun Su, Rockville, MD (US); Lin-Nan Lee, Potomac, MD (US)

(73) Assignee: Hughes Newtwork Systems, LLC, Germantown, MD (US)

( * ) Notice: Subject to any disclaimer, the term of this patent is extended or adjusted under 35 U.S.C. 154(b) by 176 days.

(21) Appl. No.: 14/986,318

(22) Filed: Dec. 31, 2015

(65) Prior Publication Data

US 2017/0195450 A1    Jul. 6, 2017

(51) Int. Cl.
*H04L 29/08* (2006.01)
*H04B 7/185* (2006.01)
(Continued)

(52) U.S. Cl.
CPC ......... *H04L 67/2857* (2013.01); *H04B 7/185* (2013.01); *H04H 20/08* (2013.01); *H04H 20/26* (2013.01); *H04H 20/40* (2013.01); *H04H 20/423* (2013.01); *H04L 65/4076* (2013.01); *H04L 65/80* (2013.01);
(Continued)

(58) Field of Classification Search
CPC .. H04N 21/433; H04B 7/185; H04L 67/2857; H04L 67/34; H04L 65/4076
See application file for complete search history.

(56) References Cited

U.S. PATENT DOCUMENTS 6,879,808 B1    4/2005    Nations et al.
7,509,667 B1    3/2009    Cook
(Continued)

OTHER PUBLICATIONS

USPTO, "International Search Report and Written Opinion", PCT/US2016/069654, dated Mar. 23, 2017.
EPO, "Extended European Search Report and Written Opinion", EPO Application No. EP168882794.7, dated Apr. 15, 2019.

*Primary Examiner* — Moustafa M Meky
*Assistant Examiner* — Kidest Mendaye
(74) *Attorney, Agent, or Firm* — Potomac Technology Law, LLC

(57) ABSTRACT

An approach for opportunistic caching of streaming media data is provided to facilitate efficient use of forward transmission resources of a broadband communications system. The approach includes receiving, by a second communications terminal, a first content response transmitted by a first content server, via a broadcast/multicast communications medium, in response to a first content request of a first client device associated with a first communications terminal, wherein the first content response includes first data content requested by the first client device via the first communications terminal. The approach further comprises determining, by a cache controller of a cache storage device of the second communications terminal, to store at least the first data content of the first content response in the local cache storage device associated with the second communications terminal, wherein the determination to store is based on one or more criteria associated with the first content response.

17 Claims, 8 Drawing Sheets

(51) Int. Cl.

| | | |
|---|---|---|
| *H04N 21/658* | (2011.01) | |
| *H04N 21/6405* | (2011.01) | |
| *H04N 21/845* | (2011.01) | |
| *H04N 21/433* | (2011.01) | |
| *H04L 29/06* | (2006.01) | |
| *H04H 20/40* | (2008.01) | |
| *H04H 20/42* | (2008.01) | |
| *H04N 21/262* | (2011.01) | |
| *H04H 20/26* | (2008.01) | |
| *H04H 20/08* | (2008.01) | |

(52) U.S. Cl.
  CPC ..... *H04N 21/26291* (2013.01); *H04N 21/433* (2013.01); *H04N 21/4331* (2013.01); *H04N 21/6405* (2013.01); *H04N 21/6581* (2013.01); *H04N 21/8456* (2013.01); *H04L 67/34* (2013.01)

(56) References Cited

U.S. PATENT DOCUMENTS

| | | |
|---|---|---|
| 8,458,750 B2 | 6/2013 | St. John-Larkin et al. |
| 2006/0059223 A1* | 3/2006 | Klemets ................... H04N 5/76 709/200 |
| 2009/0276815 A1* | 11/2009 | Casagrande ....... H04N 7/17318 725/87 |
| 2010/0177642 A1 | 7/2010 | Sebastian et al. |
| 2012/0191804 A1* | 7/2012 | Wright ............. G06F 17/30902 709/217 |
| 2013/0081072 A1 | 3/2013 | Alward et al. |
| 2013/0097236 A1 | 4/2013 | Khorashadi |
| 2013/0124751 A1 | 5/2013 | Ando et al. |
| 2013/0254815 A1 | 9/2013 | Pfeffer et al. |
| 2014/0362761 A1* | 12/2014 | Dankberg ............. H04L 67/325 370/312 |
| 2017/0201596 A1* | 7/2017 | Vassilakis ........... H04L 67/2842 |

* cited by examiner

APPARATUS AND METHOD FOR BROADCAST/MULTICAST CONTENT DELIVERY AND OPPORTUNISTIC CACHING IN A BROADBAND COMMUNICATIONS NETWORK

BACKGROUND

The overall capacities of broadband satellites are increasing exponentially, and such capacity increases present unique challenges in the associated ground system and network designs. The goal of the system designers, system operators, and service providers is to support and provide efficient, robust, reliable and flexible services, in a shared bandwidth network environment, utilizing such high capacity satellite systems.

According to recent internet traffic studies, media streaming traffic (e.g., video streaming) makes up more than 50% of forward link bandwidth from servers to client devices, where as much as 35% of such traffic is from Netflix servers. Further, the trend is moving upwards as more and more content providers start offering media (e.g., video) streaming services. For example, recent additions include HBO, CBS and other network and content provider streaming services. With regard to such streaming traffic, studies also show that the Pareto Principle (also known as the 80/20 rule) applies to most of the content, where 20% of the overall available content makes up upwards of 80% or more of the overall content streamed over the Internet. In other words, the same content is repeatedly transmitted (over and over again) at different times and to different client requestors, which results in extremely inefficient use of forward link transmission resources (from the content servers to the users), which resources are continually becoming ever more scarce and more expensive. In fact, data regarding one of the top video streaming services shows that 10% of streamed movie titles makes up close to 80% of the providers overall streaming video delivery. In addition to video streaming, software updates of large software companies (e.g., Apple and Microsoft) also tend to hog Internet traffic resources during peak delivery times of new updates. For example, the recent iOS 8 updates provided by Apple, upon release, almost instantly became approximately 16% of total network traffic during peak hours and continued to stay above 13% of total traffic into evening hours. Also, with such software updates (e.g., Apple iOS and Microsoft Windows updates), a large number of users are downloading the same content at different times within a relatively short time period.

What is needed, therefore, is one or more approaches that provide for efficient use of forward transmission resources of a broad-based communications system for the delivery of popular high-demand streaming content (of large file sizes) to multiple users at different times.

SOME EXAMPLE EMBODIMENTS

The present invention advantageously addresses the foregoing requirements and needs, as well as others, by providing systems and methods that facilitate efficient use of forward transmission resources of a broad-based communications system for the delivery of popular high-demand streaming content (of large file sizes) to multiple users at different times.

By way of example, in a broadband communications system that provides broadcast and/or multicast transmission services, embodiments of the present invention take advantage of the broadcast/multicast capabilities to achieve efficient use of the bandwidth resources in the provision of streaming media/software content to multiple user/client devices at different times. More specifically, certain client terminal devices may each be equipped with local storage (e.g., cache) sufficient to store a number of streaming media content files. Such terminal devices may also be equipped with processing functionality that would recognize certain popular, high-demand content files being streamed over a broadcast/multicast channel that can be received by the terminal devices. When at least one user within the coverage area of a broadcast/multicast channel popular requests popular, high-demand content, the content can be transmitted over the channel to the respective terminal/client device to satisfy the user request. Then, each non-requesting terminal device within that coverage area, that is equipped with the respective storage and processing functionality, can detect the content stream and opportunistically store the content locally within its storage. Accordingly, in the event that another user subsequently requests content that is cached within the respective user terminal device, the terminal device can deliver the content to the user from its local storage without requiring another network transmission from the respective content server. Local cache storage thereby solves the problem of serving requests for the same content initiated by different users at different times, even though the content is broadcast to the users only one time before the users actually request/consume the content. In such a system, therefore, for multi-Giga-byte content (e.g., movies and high-demand software updates such as Apple iOS and Microsoft Windows updates), one broadcast of a particular piece of content potentially could satisfy all users within the broadcast/multicast coverage who wish to consume the content, which would save a significant amount of transmission resources.

In accordance with example embodiments, a method is provided for opportunistic caching of streaming media data is provided to facilitate efficient use of forward transmission resources of a broadband communications system. A second communications terminal receives a first content response, transmitted by a first content server, via a broadcast or multicast communications medium, in response to a first content request of a first client device associated with a first communications terminal, wherein the first content response includes first data content requested by the first client device via the first communications terminal. A cache controller of a local cache storage device associated with the second communications terminal determines to store at least the first data content of the first content response in the local cache storage device associated with the second communications terminal, wherein the determination to store is based on one or more criteria associated with the first content response. By way of example, the first data content of the first content response comprises at least one segment of a sequence of segments of a data file requested by the first client device, via the first communications terminal, as part of a streaming data session of the first client device. By way of further example, streaming data session of the first client device comprises one of a streaming media data session and a streaming software download data session. By way of further example, the cache controller and the local cache storage device are components of the second communications terminal.

According to a further example embodiment of the method, the second communications terminal receives a plurality of further content responses transmitted by the first content server, via the broadcast or multicast communications medium, in response to respective further content requests of the first client device, wherein each further content response includes further data content comprising at least one subsequent segment of the sequence of segments of the data file requested by the first client device, via the first communications terminal, as part of the streaming data session of the first client device. The cache controller of the local cache storage device associated with the second communications terminal determines to store at least the further data content of each of the further content responses in the local cache storage device associated with the second communications terminal, wherein the determination to store is based on the one or more criteria.

According to a further example embodiment of the method, the second communications terminal receives a second content request of a second client device associated with the second communications terminal, the second content request requesting second data content from a server via the second communications terminal, wherein the server is one of the first content server and a second content server. The cache controller of the local cache storage device associated with the second communications terminal determines that the second data content requested by the second content request of the second client device is substantively equivalent to the first data content of the first content response stored in the local cache storage device associated with the second communications terminal. The first data content of the content response stored in the local cache storage device associated with the second communications terminal is retrieved, and the first data content is provided to the second client device as a second content response in response to the second content request.

According to a further example embodiment of the method, the second communications terminal receives a second content request of a second client device associated with the second communications terminal, the second content request requesting second data content from a server via the second communications terminal, wherein the server is one of the first content server and a second content server. The cache controller of the local cache storage device associated with the second communications terminal determines that the second data content requested by the second content request is not substantively equivalent any data content stored in the local cache storage device associated with the second communications terminal. The second content request is transmitted to the server, and a second content response is received from the server in response to the second content request, wherein the second content response includes the requested second data content. The second content response is provided to the second client device in response to the second content request.

According to a further example embodiment of the method, the second communications terminal receives a plurality second content requests of a second client device associated with the second communications terminal, wherein each second content request requests, from a server, data content comprising at least one segment of a sequence of segments of a data file requested by the second client device, via the second communications terminal, as part of a streaming data session of the second client device, and wherein the server is one of the first content server and a second content server. The cache controller of the local cache storage device associated with the second communications terminal determines that the data content requested by each of one or more of the second content requests is substantively equivalent to the further data content of a respective one of the further content responses stored in the local cache storage device associated with the second communications terminal. The further data content of the respective one of the further content responses that is determined as being substantively equivalent to the data content requested by each of the one or more second content requests is retrieved from the local cache storage device associated with the second communications terminal, and each such further data content of the respective one of the further content responses is provided to the second client as a content response in response to a respective one of the second content request.

According to a further example embodiment of the method, the second communications terminal receives a plurality second content requests of a second client device associated with the second communications terminal, wherein each second content request requests, from a server, data content comprising at least one segment of a sequence of segments of a data file requested by the second client device, via the second communications terminal, as part of a streaming data session of the second client device, and wherein the server is one of the first content server and a second content server. The cache controller of the local cache storage device associated with the second communications terminal determines that the data content requested by each of one or more of the second content requests is not substantively equivalent to any data content stored in the local cache storage device associated with the second communications terminal. Each of the one or more second content requests, for which the requested data content is determined as not being substantively equivalent to any data content stored in the local cache storage device associated with the second communications terminal, is transmitted to the server, and a respective second content response is received from the server in response to each of the second content requests transmitted thereto, wherein each such second content response includes the respective requested data content. Each of the second content responses received from the server is provided to the second client device in response to the respective second content request.

In accordance with further example embodiments, a communications terminal comprises a cache controller, a cache storage device, a client device interface, a receiver device, and a transmitter device. The client device interface is operable to interface with a second client device. The receiver device is operable to receive a first content response transmitted by a first content server, via a broadcast or multicast communications medium, in response to a first content request of a first client device associated with another communications terminal, wherein the first content response includes first data content requested by the first client device via the other communications terminal. The cache controller is operable to determine to store at least the first data content of the first content response in the cache storage device, and the determination to store is based on one or more criteria associated with the first content response. By way of example, the first data content of the first content response comprises at least one segment of a sequence of segments of a data file requested by the first client device, via the other communications terminal, as part of a streaming data session of the first client device. By way of further example, the streaming data session of the first client device comprises one of a streaming media data session and a streaming software download data session.

According to a further example embodiment of the communications terminal, the receiver device is further operable to receive a plurality of further content responses transmitted by the first content server, via the broadcast or multicast communications medium, in response to respective further content requests of the first client device, wherein each further content response includes further data content comprising at least one subsequent segment of the sequence of segments of the data file requested by the first client device, via the other communications terminal, as part of the streaming data session of the first client device. The cache controller is further operable to determine to store at least the further data content of each of the further content responses in the cache storage device, and the determination to store is based on one or more criteria.

According to a further example embodiment of the communications terminal, the client device interface is further operable to receive a second content request of the second client device, the second content request requesting second data content from a server via the communications terminal, wherein the server is one of the first content server and a second content server. The cache controller is further operable to determine that the second data content requested by the second content request of the second client device is substantively equivalent to the first data content of the first content response stored in the cache storage device, and to retrieve the first data content of the content response from the cache storage device. The client device interface is further operable to provide the first data content to the second client device as a second content response in response to the second content request.

According to a further example embodiment of the communications terminal, the client device interface is further operable to receive a second content request of the second client device, the second content request requesting second data content from a server via the communications terminal, wherein the server is one of the first content server and a second content server. The cache controller is further operable to determine that the second data content requested by the second content request is not substantively equivalent any data content stored in the cache storage device. The transmitter device is operable to transmit the second content request to the server, and the receiver device is further operable to receive a second content response from the server in response to the second content request, wherein the second content response includes the requested second data content. The client device interface is further operable to provide the second content response to the second client device in response to the second content request.

According to a further example embodiment of the communications terminal, the client device interface is further operable to receive a plurality second content requests of the second client device, wherein each second content request requests, from a server, data content comprising at least one segment of a sequence of segments of a data file requested by the second client device, via the communications terminal, as part of a streaming data session of the second client device, and wherein the server is one of the first content server and a second content server. The cache controller is further operable to determine that the data content requested by each of one or more of the second content requests is substantively equivalent to the further data content of a respective one of the further content responses stored in the cache storage device, and to retrieve from the cache storage the further data content of the respective one of the further content responses that is determined as being substantively equivalent to the data content requested by each of the one or more second content requests. The client device interface is further operable to provide each such further data content of the respective one of the further content responses to the second client as a content response in response to a respective one of the second content requests.

According to a further example embodiment of the communications terminal, the client device interface is further operable to receive a plurality second content requests of a second client device, wherein each second content request requests, from a server, data content comprising at least one segment of a sequence of segments of a data file requested by the second client device, via the communications terminal, as part of a streaming data session of the second client device, and wherein the server is one of the first content server and a second content server. The cache controller is further operable to determine that the data content requested by each of one or more of the second content requests is not substantively equivalent to any data content stored in the cache storage device associated with the second communications terminal. The transmitter device is operable to transmit each of the one or more second content requests, for which the requested data content is determined as not being substantively equivalent to any data content stored in the cache storage device, to the server. The receiver device if further operable to receive a respective second content response from the server in response to each of the second content requests transmitted thereto, wherein each such second content response includes the respective requested data content. The client device interface is further operable to provide each of the second content responses received from the server to the second client device in response to the respective second content request.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Systems and methods that facilitate efficient use of forward transmission resources of a broad-based communications system for the delivery of popular high-demand streaming content (of large file sizes) to multiple users at different times, is described. In the following description, for the purposes of explanation, numerous specific details are set forth in order to provide a thorough understanding of the present invention. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Figure 1:
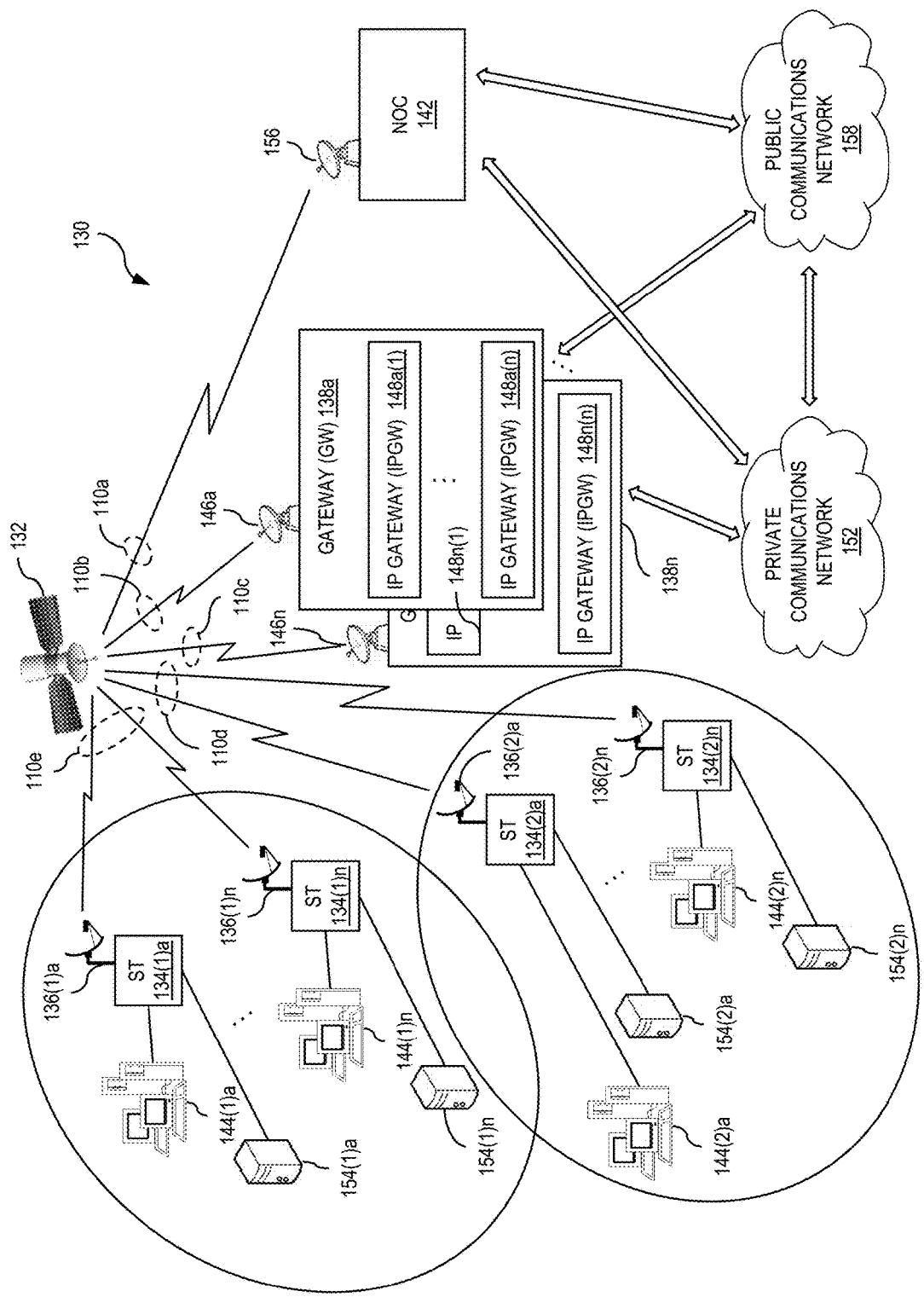
FIG. 1 illustrates a block diagram of a satellite communications system for providing content delivery via broadcast and multicast communications to user terminals wherein opportunistic caching is employed, in accordance with example embodiments.

FIG. 1 illustrates a block diagram of a satellite communications system for providing content delivery via broadcast and multicast communications to user terminals wherein opportunistic caching is employed, in accordance with example embodiments of the present invention. Satellite communications system 130 includes a satellite 132 that supports communications among multiple satellite terminals (STs) 134(1)a-134(1)n and 134(2)a-134(2)n, a number of gateways (GWs) 138a-138n, and a network operations center (NOC) 142. The STs, GWs and NOC transmit and receive signals via the antennas 136(1)a-136(1)n and 136(2)a-136(2)n, 146a-146n, and 156, respectively. According to different embodiments, the NOC 142 may reside at a separate site reachable via a separate satellite channel or may reside within a GW site, and alternatively the NOC 142 may comprise a distributed system that is distributed amongst a plurality of sites for purposes of distributed processing, scalability, etc. Further, as depicted, in a spot beam system, the satellite communicates with the various ground infrastructure (the STs, GWs and NOC) via a plurality of uplink and downlink spot beams 110a, 110b, 110c, 110d, 110e. By way of example, the NOC and each GW may each be serviced by a dedicated uplink and downlink spot beam pair, and the groups of STs (e.g., the group of STs 134(1)a-134(2)n and the group of STs 134(2)a-134(2)n) may each be serviced by a dedicated uplink and downlink spot beam pair as a group—a shared bandwidth architecture, where the STs share the respective uplink and downlink bandwidth of a spot beam amongst them. Each uplink beam and downlink beam covers a respective geographic area on the Earth that is shaped according to the respective antenna designs of the uplink and downlink antennae of the satellite. Further, the uplink beam of a particular coverage area need not be contiguous with a respective downlink beam of that area—but rather, for example, the coverage area of a particular uplink beam may be broken up and covered by multiple downlink spot beams. Additionally, the uplink and downlink spot beams may also be streerable for dynamic adjustment of capacity plans based on a geographic capacity demand distribution that changes over time.

The NOC 142 performs the management plane functions of the system 130, while the GWs 138a-138n perform the data plane functions of the system 130. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 138a-138n include one or more IP gateways (IP-GWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively.

By way of example, the Satellite communications system 130 may operate as a bent-pipe system, where the satellite essentially operates as a repeater or bent pipe. In a bent-pipe system of an example embodiment, the satellite 132 operates as a repeater or bent pipe, whereby communications to and from the STs 134a-134n are transmitted over the satellite 132 to and from respective IPGWs associated with particular STs. Further, in a spot beam system, any one spot beam operates as a bent-pipe to a geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks). For example, content (e.g., streaming video content, such as a streaming movie) originating from a content server (not shown) may be provided to the GW 138a and the IPGW 148a(1). Then (via a broadcast beam or spot beam of the satellite 132) the content may subsequently be broadcast by the gateway 138a to the terminals 134a-134n within a respective broadcast beam of the satellite, or multicast to a subset of the terminals 134a-134n via a spot beam of the satellite. Further, while the content may be directed to one or more specific terminals (e.g., that requested the content), other terminals within the reception beam may opportunistically cache the content for the event that users of one or more of the other terminals subsequently request the content.

Figure 2:
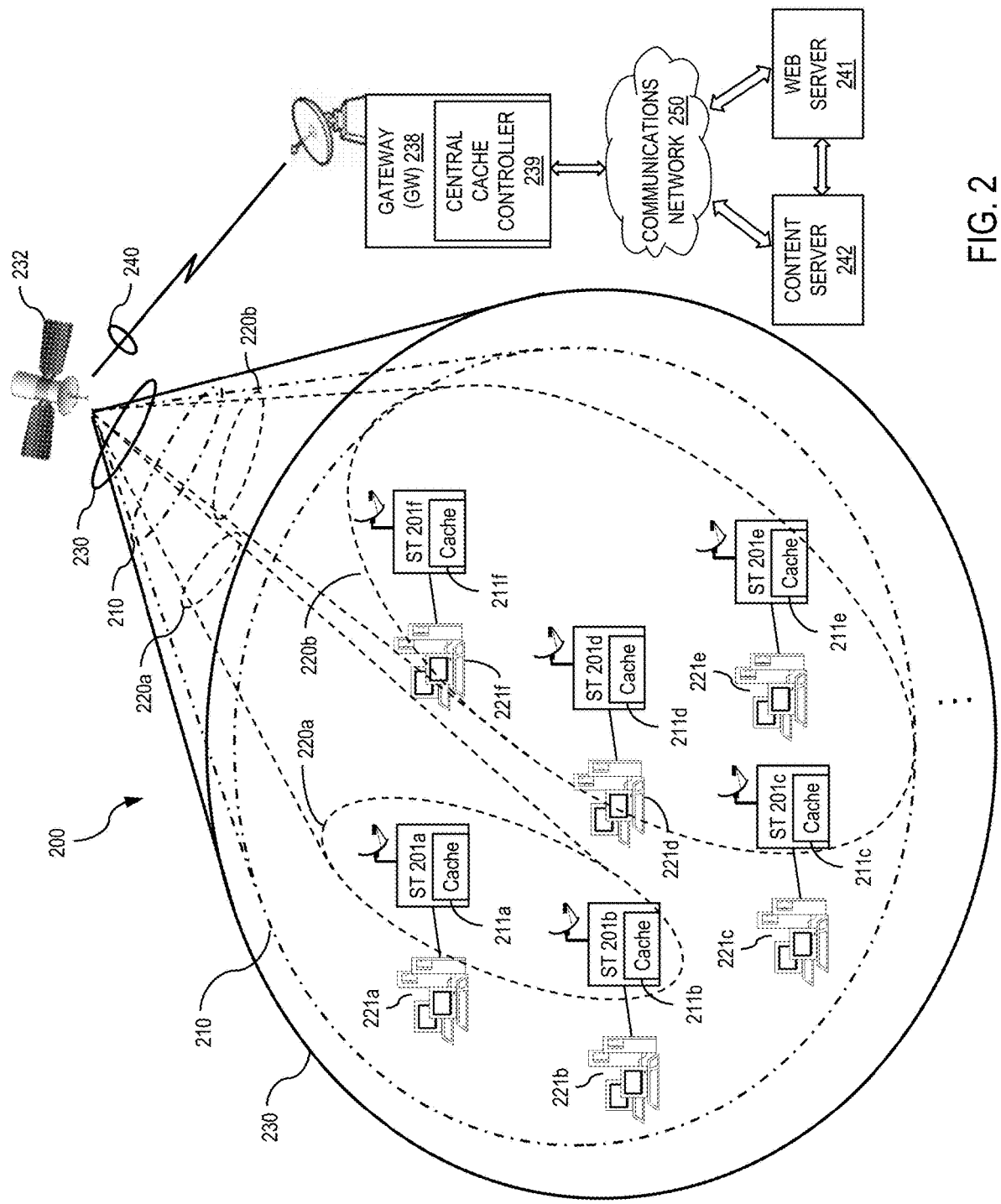
FIG. 2 illustrates a block diagram of a further satellite communications system for providing content delivery via broadcast and multicast communications to user terminals wherein opportunistic caching is employed, in accordance with example embodiments.

FIG. 2 illustrates a block diagram of a further satellite communications system for providing content delivery via broadcast and multicast communications to user terminals wherein opportunistic caching is employed, in accordance with example embodiments of the present invention. The system 200 comprises a satellite 232, a number of satellite client/user terminals ST201a, ST201b, ST201c, ST201d, ST201e, ST201f, . . . , a gateway 238, a communications network 250 (such as the Internet) and a web server 241, and a content server 242. By way of example, the web server 241 may be an enterprise web server, such as a Netflix Internet host server or an Apple Internet host server. By way of further example, the content server may be a general content server accessible directly over the Internet, or a specific enterprise content server, such as a Netflix content server utilized for storage of Netflix content and accessible via a Netflix Internet host server. As would be apparent to one of skill in the art, the communications system 200 need not be limited to just one gateway, one communications network, one web server, and one content server. For example, as depicted in FIG. 1, a number of gateways and IP gateways may respectively serve groups of the universe of terminals in the system. Further, content may be provided to the one or more gateways, via the communications network, from a multitude of web servers and content servers (with one or more content servers being provided by each of a number of content providers). Also, content from different content providers may be provided over different delivery networks—for example, a large corporate network may provide content to a multitude of corporate sites and corporate user terminals via the Internet (e.g., over a VPN) and/or a private corporate wide area network (WAN). Moreover, it would also be apparent to one of skill in the art that the system need not be limited to any specific maximum number of satellite terminals 201—the number of terminals would be governed by associated system design factors, such as satellite capacity, number of satellite beams, the number of gateways and IP gateways, the capacity management and terminal/client management systems of the network, etc. Further, as described above, with respect to uplink and downlink beams of the satellite, FIG. 2 depicts an uplink beam 210 and two downlink beams 220a and 220b. The STs 201a-201f are all serviced by the one uplink beam 210, while the STs 201a-201b are serviced by the downlink beam 220a and the STs 201c-201f are serviced by the downlink beam 220b. The satellite 232 further provides a broadcast capability via the downlink beam 230, which would cover a relatively large geographic area (e.g., the continental United State) containing multiple individual uplink and downlink beams over that coverage area.

In accordance with example embodiments, the satellite 232 employs broadcast and/or multicast capabilities. By way of example, the satellite may include a broadcast capability, whereby it could broadcast data (e.g., streaming media content) to an entire broadcast coverage area within the downlink beam 230. Alternatively or additionally, the satellite may include multicast functionality, whereby it multicasts data (e.g., streaming media content) to all client/user satellite terminals of a particular multicast group, which may all be located in a single spot beam or may be distributed amongst multiple spot beams. Such a multicast group may comprise a group of terminals that subscribe to a particular service (such as Netflix), or a group of terminals that belong to a particular enterprise (such as small office/home office employees of the same enterprise). As would be apparent to one of skill in the art, embodiments of the present invention are not limited to satellite systems, but rather would apply to any communications system that employs broadcast, multicast or similar transmission capabilities. For example, embodiments of the present invention could also be applied to mobile devices within the coverage area of a cellular base station, mobile devices within the coverage area of multiple cellular base stations served by a common gateway, Wi-Fi devices within the coverage area of a Wi-Fi access point, Wi-Fi devices within the coverage area of multiple Wi-Fi access points served by a common gateway, etc.

In accordance with further example embodiments, each of the terminals, that is capable of opportunistically caching streaming content according to example embodiments, is equipped with a respective cache (as depicted, each of the terminals ST201a, ST201b, ST201c, ST201d, ST201e, ST201f, . . . , is equipped with a respective cache 211a, 211b, 211c, 211d, 211e, 211f, . . . . Additionally, each terminal services one or more respective client devices 221a, 221b, 221c, 221d, 221e, 221f, . . . . By way of example, the client devices may comprise personal computers (PCs), laptops and mobile devices (e.g., tablet devices and smart phones, where the terminal may include wireless communications capabilities, such as WiFi or cellular capabilities). Applications running on the client devices (e.g., video streaming applications and operating systems) request content (e.g., video content such as movies and shows, and software updates, such as iOS and Windows updates) that is streamed from the content server 242 via the communications network 250, the gateway 238. The gateway in turn transmits the streamed content to the satellite 232 via the gateway channel or beam 240, and the satellite ultimately transmits the streamed content to the destination ST(s) via respective downlink beams/channels 220a and/or 220b. According to a further embodiment the gateway 238 includes the central cache controller 239.

Further, as depicted, in such a broadband communications system, comprising one or more satellite gateways, one or more satellites, and a plurality of client/user satellite terminals, the gateways communicate with content servers (e.g., web and application servers) via the communications network 250 (e.g., the Internet), and the client terminals transmit requests to and receive content responses from the gateways via channels or beams of the satellite. As used herein, a forward link refers to a communications path or channel from a gateway to the terminals, and a return link refers to a communications path or channel from a terminal to a gateway. Generally, all terminals within the coverage area of a forward link satellite beam can receive the data transmitted by a gateway over that forward link. Content is generally delivered from a content server to a client device via a request/response protocol. By way of example, Hypertext Transfer Protocol (HTTP) is a common example of such a request/response protocol. When a client wants to consume content, the client issues a content request to a content server. The request is received by the satellite terminal and the terminal transmits the request to the gateway that services the terminal via the respective return link channel. The gateway then relays the request to the content server. When the content receives the content request, it acquires or retrieves the content and streams the content back to the gateway via the communications network. The gateway then relays the content response to the requesting terminal/client via the forward link channel. In the event that the gateway content response broadcast by the gateway can be received by all the terminals in the satellite beam. The terminal then provides the content response to the client. During content delivery, both content requests and content responses go through the gateway and the terminal between a client and a content server.

By way of example, a user of a particular client terminal (e.g., the client terminal 221a) may request a specific content file, for example, a movie file via the user's Netflix account. As a result, the web browser client application of the terminal 221a would forward the request, addressed to the Netflix host server (e.g., the web server 241), to the ST 201a. The ST 201a first makes a determination of whether the requested content is already stored in its local cache, and if so, the ST provides the content to the respective client terminal directly from its cash. If the content is not a restored in the local cache of the ST 201a, the ST repackages or encapsulates the request with a source address of the ST 201a and a destination address of the respective gateway servicing the ST (e.g., the gateway 238), while maintaining the original source address of the client terminal and destination address of the web server within the encapsulated packet, and transmits the message over the satellite 232 to the gateway 238. The gateway receives the transmitted message, de-encapsulates it to obtain the originally intended destination address (that of the web server 241—in this case the Netflix Internet host server), re-encapsulates the request with a source address of the gateway 238 and a destination address of the web server 241 (while still maintaining the original source address of the client terminal and destination address of the web server within the encapsulated packet), and transmits the message over the communications network 250 to the web server. In response, the web server retrieves the movie content from the content server 242, and streams the content, via the communications network 250, to the gateway 238 (which was indicated to the web server as the immediate source of the request message). For example, the web server encapsulates the streamed content data with the web server as the immediate source address and the gateway as the immediate destination address, while including the web server as the original source address and the client terminal 221a as the ultimate destination address with the encapsulated data packets, and transmits the packets to the gateway 238 via the communications network 250. Alternatively, the web server may control the content server 242 to process and transmit the content data directly to the gateway via the communications network 250.

In the absence of any central cache controller at the gateway or where the gateway determines to simply unicast the streaming content data packets to the client terminal 221a, the gateway de-encapsulates the packets to obtain the intended destination address (that of the client terminal 221a) and resolves that address as being handled by the ST 201a, re-encapsulates the packets with a source address of the gateway 238 and a destination address of the ST 201a (while maintaining the original source address of the web server 241 and destination address of the client terminal 221a within the encapsulated packet), and transmits the packets to the satellite 232. Upon receiving the packets, the respective satellite transponder transmits the packets via the corresponding downlink beam/channel 220a for receipt by the ST 201a. The ST 201a receives the content data packets, de-encapsulates the packets to determine the appropriate address resolution and resolves the destination address as the client terminal 221a, and forwards the packets to the destination terminal. As would be recognized by one of skill in the art, such a system according to example embodiments would not be limited to any specific communications protocols, but rather may employ any of various different known communications formats or protocols for the exchange of the messaging and content over the various links of the network. For example, at the Internet layer, the standardized Internet Protocol (IP) may be applied for relaying datagrams across the network boundaries, by delivering packets from the source host to the destination host solely based on the IP addresses in the packet headers. Further, at the transport layer, any one of a number of known protocols may be employed, including Transmission Control Protocol (TCP), User Datagram Protocol (UDP), etc. Similarly, various well known protocols may be applied at the application and link layers.

Alternatively, in accordance with example embodiments, when the gateway 238 begins to receive the streamed content from the web server 241 or directly from the content server 242, the central cache controller 239 of the gateway performs certain global functions regarding the content delivery and opportunistic caching. According to one such embodiment, the central cache controller monitors the content retrieved from the content server (e.g., content server 242) in response to a specific ST request for the content, and determines whether the content should be broadcast to all terminals within a broadcast beam area or multicast to one or more specific multicast terminal groups, or just unicast to the requesting client terminal. By way of example, upon receipt by the gateway 238 of the media content transmitted by the web server 241, the gateway central cache controller 239 examines packet header information or other packet information to identify the content. Upon identifying the content, for example, as a movie file (e.g., from Netflix), or as a general software update (e.g., an Apple iOS or Microsoft Windows update), the cache controller would determine, based on various predetermined criteria, whether to broadcast or multicast the content to multiple terminals or whether to just unicast the content to the requesting terminal. In the case of a broadcast, the gateway encapsulates the content packets as broadcast packets with a destination address indicating the broadcast downlink beam of the satellite. Further, the encapsulation by the gateway maintains the original web server source address and requesting terminal destination address within the packets in order to enable the requesting terminal to identify the content data packets when received over the broadcast channel. Additionally, content identifiers are maintained within the packets in order for the original requesting client terminal to identify the content. In the case of a multicast, the gateway encapsulates the content packets as multicast packets addressed to the respective multicast group(s), and the satellite in turn transmits the packets over the respective downlink beams/channels that cover the STs of the destination multicast terminal group. Here also, the encapsulation by the gateway maintains the original web server source address and requesting terminal destination address within the packets in order to enable the requesting ST to identify the content data packets when received over the respective downlink beams/channels, and content identifiers are maintained within the packets in order for the original requesting client terminal to identify the content. According to a further embodiment, in the case of a broadcast or multicast delivery of content, the gateway marks the content (e.g., via an indicator field in a header of the content data packets) as being designated for opportunistic caching by the STs that receive the broadcast/multicast content.

According to one such embodiment, the criteria may include popularity statistics for the content relative to the users within the broadcast beam or the users of one or more particular multicast groups. By way of example, one factor may be the relative popularity of the content (e.g., the movie title) amongst subscribers to the particular content service (e.g., Netflix) or the broader public as a gauge of the likelihood that other users would subsequently request the same content. Further, the popularity statistics may relate to overall public popularity as a basis for broadcasting the content to an overall user base within the respective broadcast beam. Alternatively or additionally, the popularity statistics may relate to popularity amongst a specific multicast user group (e.g., a multicast user group of Netflix subscribers, or multicast user group of iOS or Windows based client terminals/devices, or a multicast user group of one or more specific demographics) as a basis for broadcasting the content to one or more respective multicast groups. As a further example, the popularity statistics may relate to popularity amongst a particular geographic area of one or more downlink spot beams of the satellite (e.g., the southern United States, certain metropolitan areas of the United States, etc.), in which case the content may be transmitted via one or more respective satellite downlink beams and marked or indicated (e.g., via a packet header field) as cacheable by all STs within the respective coverage areas that are configured for opportunistic caching, in accordance with example embodiments of the present invention.

According to further example embodiments, multiple criteria may be applied together or applied in a tiered approach. According to one such embodiment, in addition to popularity statistics, the criteria may include the respective transmit throughput or transmission rates of the different delivery channels. For example, the transmit throughput or rate may vary significantly between a broadcast channel, the respective channels of a multicast transmission and a unicast channel. The transmission rate of a unicast channel depends only on the link characteristics of the particular destination ST and can be as high as the terminal can sustain. Conversely, the transmission rate of a broadcast channel is limited by the highest transmission rate that can support all the terminals within the coverage area (the lowest common denominator), which may be lower than that of the specific ST from which the content request originated. Accordingly, when the transmission rates differ significantly amongst the respective delivery channels, a lower broadcast transmission rate may adversely affect the ultimate QoS achieved (and resulting quality of the streamed content playback) to an unacceptable degree—in which case, the gateway may choose to not broadcast the content, and may instead multicast the content to a subset of the STs that are capable of maintaining a minimum transmit rate necessary for an acceptable QoS level or may simply unicast the content to the original requestor (irrespective of the popularity determination).

Moreover, as would be apparent to one of skill in the art, various different types and combinations of criteria may be applied for the gateway determination of whether or not to broadcast or multicast the requested content, in accordance with example embodiments. Such criteria may be designed to address various different factors, including, without limitation, business factors, statistical factors, network constraint factors, etc. Further, as would be readily recognized, any such types and combinations of additional factors would be within the general scope of the potential embodiments of the present invention.

According to yet further example embodiments, the gateway central cache controller 239 may be responsible for further functions. By way of example, the central cache controller would keep track of content requests and respective content responses and their association. By way of further example, the central cache controller may prefetch content based on an initial content request, whereby, based on receipt of a request for a single or initial segment of an overall content title, the central cache controller would generate and transmit request(s) to the respective content server for all segments of the content title or for the overall content title. By way of further example, the central cache controller may be configured to keep track of the respective status of the local ST caches, as needed.

Figure 3:
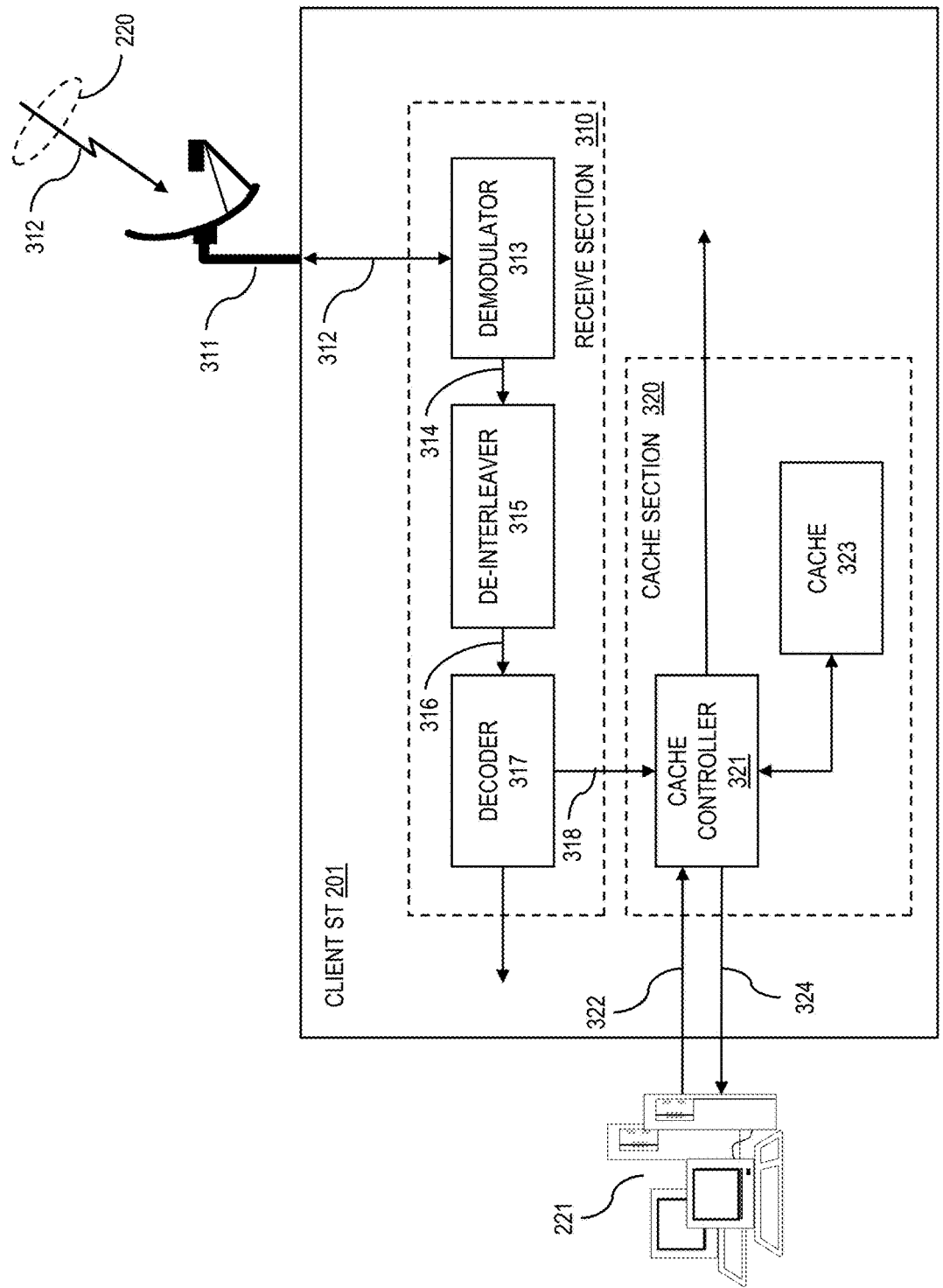
FIG. 3 illustrates a block diagram of the receive section and cache section of a client satellite terminal (ST) configured for opportunistic caching of content delivered via broadcast and multicast communications channels, in accordance with example embodiments.

FIG. 3 illustrates a block diagram of the receive section 310 and cache section 320 of a client satellite terminal (ST) 201 configured for opportunistic caching of content delivered via broadcast and multicast communications channels, in accordance with example embodiments of the present invention. The receive section 310 comprises a transmit/receive antenna 311, a demodulator 313, a de-interleaver 315 and channel decoder 317. The antenna 311 receives a signal waveform 312 transmitted over the downlink beam/channel 220 from the satellite 232. The demodulator 313 demodulates, filters and samples the received signal waveform to obtain received estimates of the symbols 314 of the source data carried by the received signal waveform. The de-interleaver 315 reorders the sequence of symbols or bits based on a predetermined manner of interleaving applied at the source transmitter to generate a de-interleaved bit sequence 316. The decoder 317 then decodes the de-interleaved bit sequence to regenerate the symbols and obtain the original source data content 318. The cache section 320 comprises a cache controller 321 and a cache memory or storage 323. According to example embodiments, the cache controller is configured to receive the decoded data content, and to make cache decisions (e.g., whether or not to cache received content that was received by the ST 201 via multicast or broadcast transmission, where the ST was not the original requestor of the content). Additionally, the cache controller 321 would be configured to receive a content request message 322 from the client terminal 221, and determine whether the requested content is already stored in the cache 323—in which case, the cache controller 321 would serve the content to the client terminal 221 directly from the cache 323, without having to retrieve the content from the web server 241 or the content server 242, via the satellite 232, gateway 238 and communications network 250.

According to such example embodiments, in the case where the gateway 238 configures the streaming content data packets for broadcast transmission or multicast transmission via the satellite 232, and the client ST 201 is either within the broadcast beam (in the case of a broadcast transmission) or (in the case of a multicast transmission) is within a multicast group to which the transmission is targeted, the client ST 201 will receive the transmitted content data packets. Then, once each content data packet is decoded and provided to the cache controller 321, the cache controller would make a determination, based on certain predetermined criteria, of whether or not to store the content within the cache 323. According to one embodiment, the cache controller may be configured to simply determine whether or not a copy of the particular content is already stored in the cache, and if not, then to automatically store the content in the cache. According to a further embodiment, the cache controller may be configured to make a more sophisticated determination of whether or not to store the content. By way of example, the cache controller may be configured to determine whether or not to cache the content based on a content type or genre with respect to one or more user profiles associated with the client terminal(s) 221 serviced by the respective client ST2 201. By way of further example, the cache controller may be configured to determine whether or not to cache the content based on one or more service subscriptions associated with the client terminal(s) 221 serviced by the respective client ST2 201. Moreover, the cache controller of the ST that originally requested the content may also make a determination of whether to store the content in its local cache, for example, based on cash management policies/criteria of that ST. Further, the cache controller of each ST would be configured to manage the storage of content in its local cache based on certain respective predetermined cash management policies addressing such factors as age of the different content titles stored in the cache for scenarios where the cache controller may determine to replace an existing content title in its cash with a new content title being received via a broadcast/multicast delivery.

Moreover, as with the criteria for the determination by the gateway of whether to broadcast/multicast the requested content, various different types and combinations of criteria may be applied for the client ST cache controller determination of whether or not to store the content received via the multicast/broadcast transmission in the local terminal cache for potential subsequent consumption by respective users of client terminals serviced by the client ST, in accordance with example embodiments. Again, such criteria may be designed to address various different factors, including, without limitation, business factors, statistical factors, network constraint factors, ST storage constraints, etc. Further, as would be readily recognized, any such types and combinations of additional factors would be within the general scope of the potential embodiments of the present invention.

Further, on the other end, when a user selects streaming content (e.g., streaming media content or a software update) via an application (e.g., a web browser) on the client terminal 221, the client terminal sends a corresponding content request message 322 to the client ST 201. The content request message is received by the cache controller 321, and, according to example embodiments, the cache controller is configured to first determine whether the requested content is already stored in the cache from a previous broadcast/multicast transmission in response to a content request of a different terminal. If the requested content is already stored in the cache 323, then the cache controller retrieves the requested content from the cache 323 and delivers it directly from the cache to the client terminal 221. Accordingly, such an opportunistic caching mechanism thereby saves significant time by not having to retrieve the content via a series of transactions with the respective remote web server controlling the requested content, and saves significant network resources (especially the valuable and limited resources of a satellite or cellular wireless network) by not having to utilize the additional network bandwidth to retrieve the content from the remote web server.

Local cache is located at user's terminals. It has the following functions: Capable of associating a content request with content stored in the local cache. Associate a request for whole content with content in the local cache. Associate a request for a segment of the content with content in the local cache and serve the corresponding segment of the content to the client. Responsible for cache management. Decide if the content is to be cached or not. Cache replacement policy. The policy can be based on preference of the users attached to a terminal. Send cache status to central cache controller as needed.

Figure 4A:
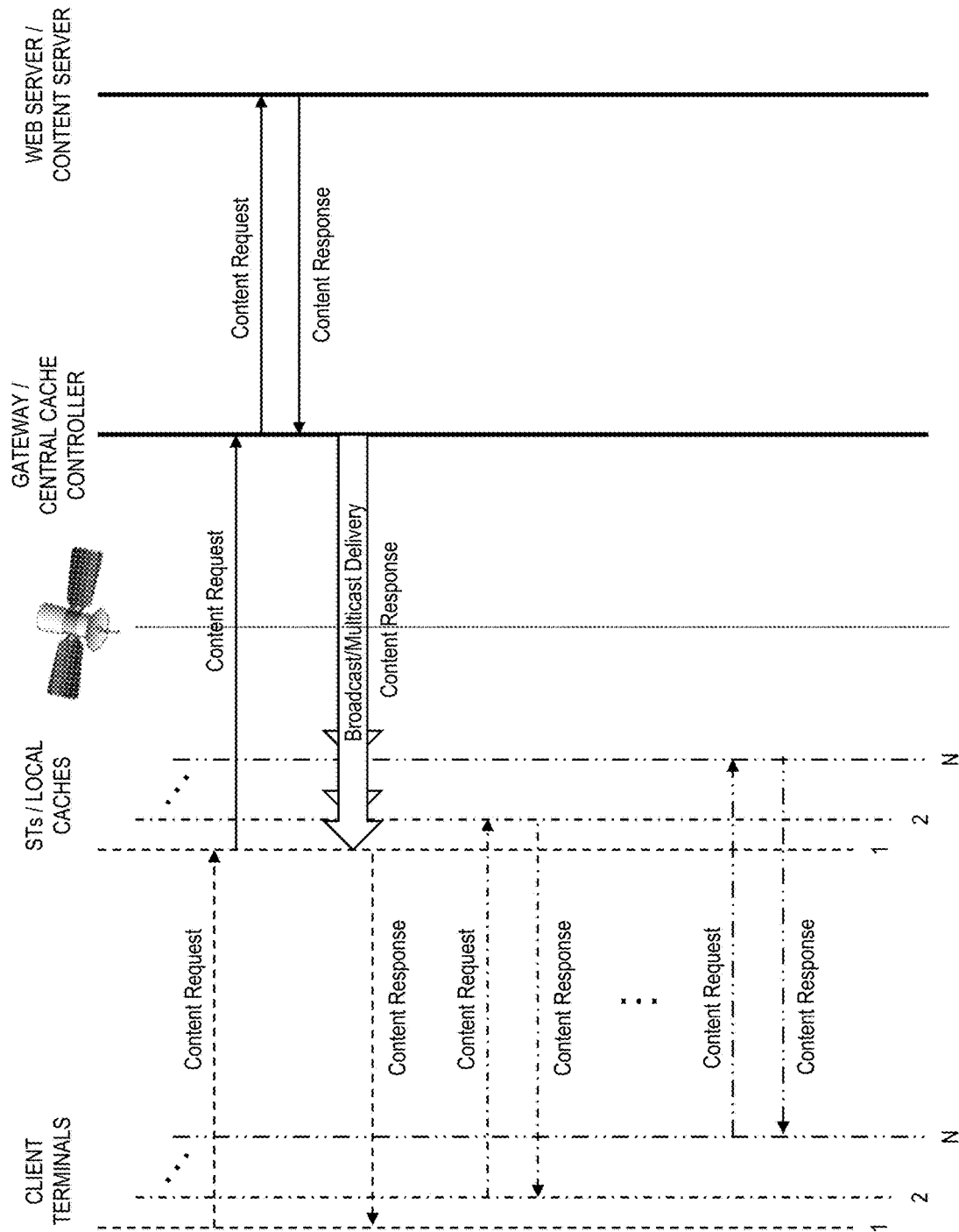
FIG. 4A illustrates a flow diagram of a process for a single content request, and broadcast/multicast content delivery and opportunistic caching, in accordance with example embodiments.

FIG. 4A illustrates a flow diagram of a process for a single content request, and broadcast/multicast content delivery and opportunistic caching, in accordance with example embodiments of the present invention. As shown in FIG. 4A, at the client end, there are N client terminals serviced by N respective client STs, each having a local cache for opportunistic caching of streamed content. When a user at the client terminal 1 requests content, e.g., via a content or media web application, the terminal sends a content request to the ST 1 servicing that client terminal. The ST first makes a determination of whether the requested content is already stored in its local cache, and if so, the ST provides the content to the respective client terminal directly from its cash. If the content is not a restored in the local cache of the ST, the ST in turn sends a content request to the respective gateway servicing that ST, and the gateway retrieves the content from the respective web server/content server, via a request response protocol, such as an HTTP protocol over the Internet. When the gateway receives the content response, as discussed above, it makes a determination to deliver the content via a broadcast/multicast delivery method (e.g., over respective satellite communications channels). As the ST 1 receives the broadcast/multicast content, and forwards the content response on to the respective client terminal 1. Additionally, the further client STs 2-N receive the broadcast/multicast content delivery, and determine that the content is designated for opportunistic caching (e.g., based on the content type or title, or an indicator provided by the gateway in a header of the content data packets). Accordingly, the cache controller of each such further client ST determines whether the content is already stored in its cache, and if not, the cache controller stores the content in the local cache of the ST. Alternatively, as discussed above, the ST may also make a determination based on predetermined local criteria whether or not to cache the received content. When the requesting ST receives the content, the cache controller of that ST makes a determination of whether to store the content in its local cache, and the ST begins delivery of the content to the respective client terminal 1. Subsequently, if/when users of the other client terminals 2-N decide to access the same content, the respective client terminal sends a content request to the respective ST servicing the terminal, and the cache controller of that ST determines that the content is already stored in its local cache and accordingly provides the content to the respective client terminal (without having to retrieve the content from the respective web server/content server.

Figure 4B:
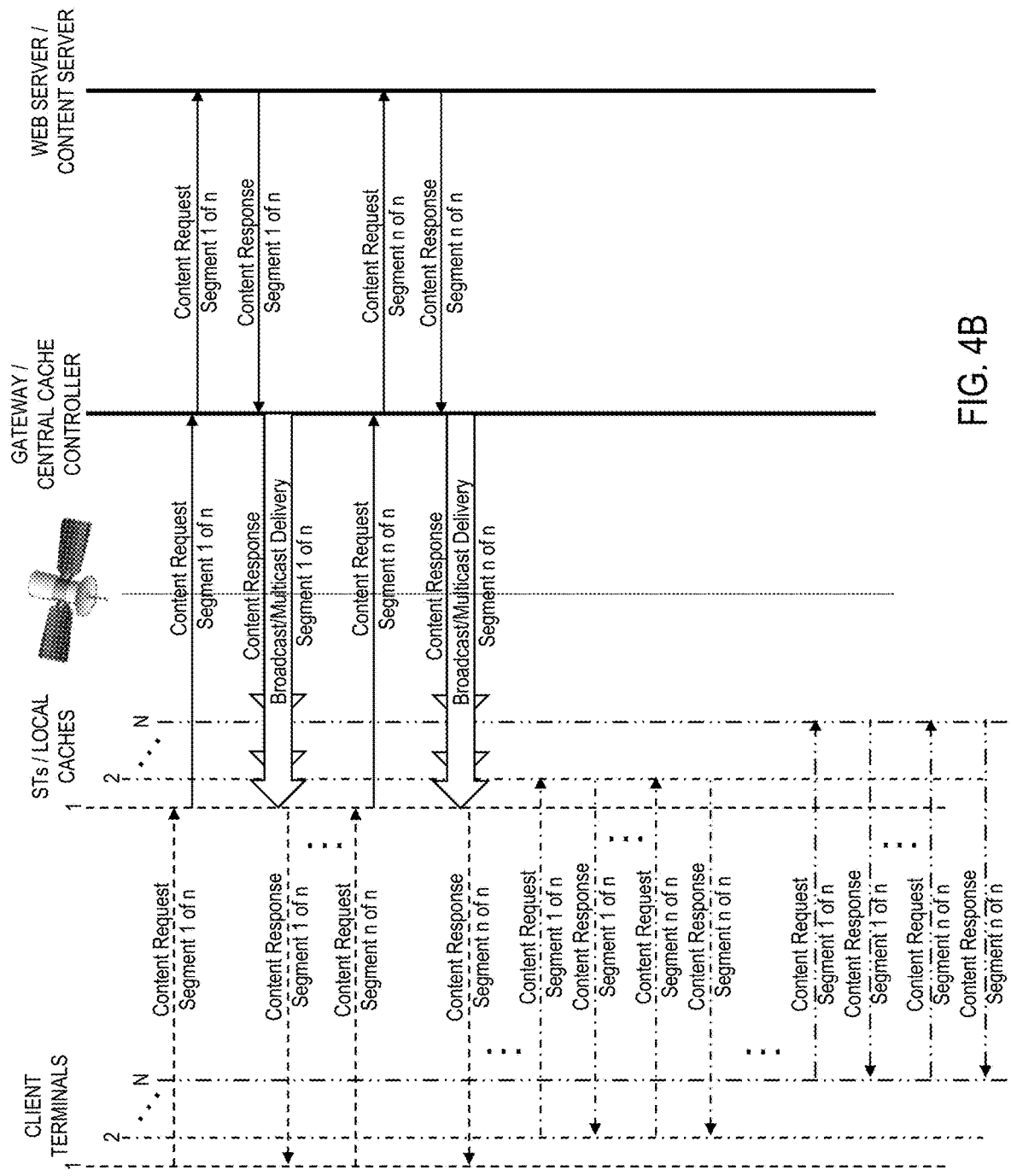
FIG. 4B illustrates a flow diagram of a process for a multi-segment content request, and broadcast/multicast content delivery and opportunistic caching, in accordance with example embodiments.

FIG. 4B illustrates a flow diagram of a process for a multi-segment content request, and broadcast/multicast content delivery and opportunistic caching, in accordance with example embodiments of the present invention. FIG. 4B shows a case where the content is segmented into multiple segments either virtually or physically and is accessed by using multiple content requests, one request for each segment. There are "n" segments of the content and the client terminal/client ST issues "n" requests, one for each segment of the content. Again, the cache controller of the ST servicing the requesting client terminal first makes a determination as to whether the requested content is a restored in the local cache of the ST. If the requested content is not stored in the local cache of the ST, then the ST forwards the content request on to the gateway, and the gateway retrieves the content from the respective web server/content server. The gateway in turn makes the decision (as discussed above) to deliver each content segment via a broadcast or multicast delivery method, and the STs that receive the broadcast/multicast content make a determination (e.g., based on their respective local cache management policies/criteria) to store the received content in the respective local caches. Subsequently, on a segment by segment basis, the further client terminals can make requests for the same content segments, which would be serviced directly via the respective ST local caches. When each such further ST receives a request for a particular segment of the content, the cache control of that ST can service the request directly from its local cache, provided that the particular segment has been received by the ST and has been stored in its local cache. As would be apparent, the requests/responses for particular content segments may occur with respect to the different client terminal and ST pairs in any order, and, provided that the particular requested content segment has been received by the ST and has been stored in its local cache, the ST would be able to service that request directly from its local cache. Further, as would also be apparent, the subsequent content requests of other client terminal/ST pairs may request the content from the same content server as the original content request that resulted in the local cache storage of the response data, or from a different server that provides streaming media services and stocks the same media content and particular content file (e.g., as a given PBR)—as long as the segments from the same content file are stored in the local cache, the respective ST can serve the content requests from the local cache.

Figure 4C:
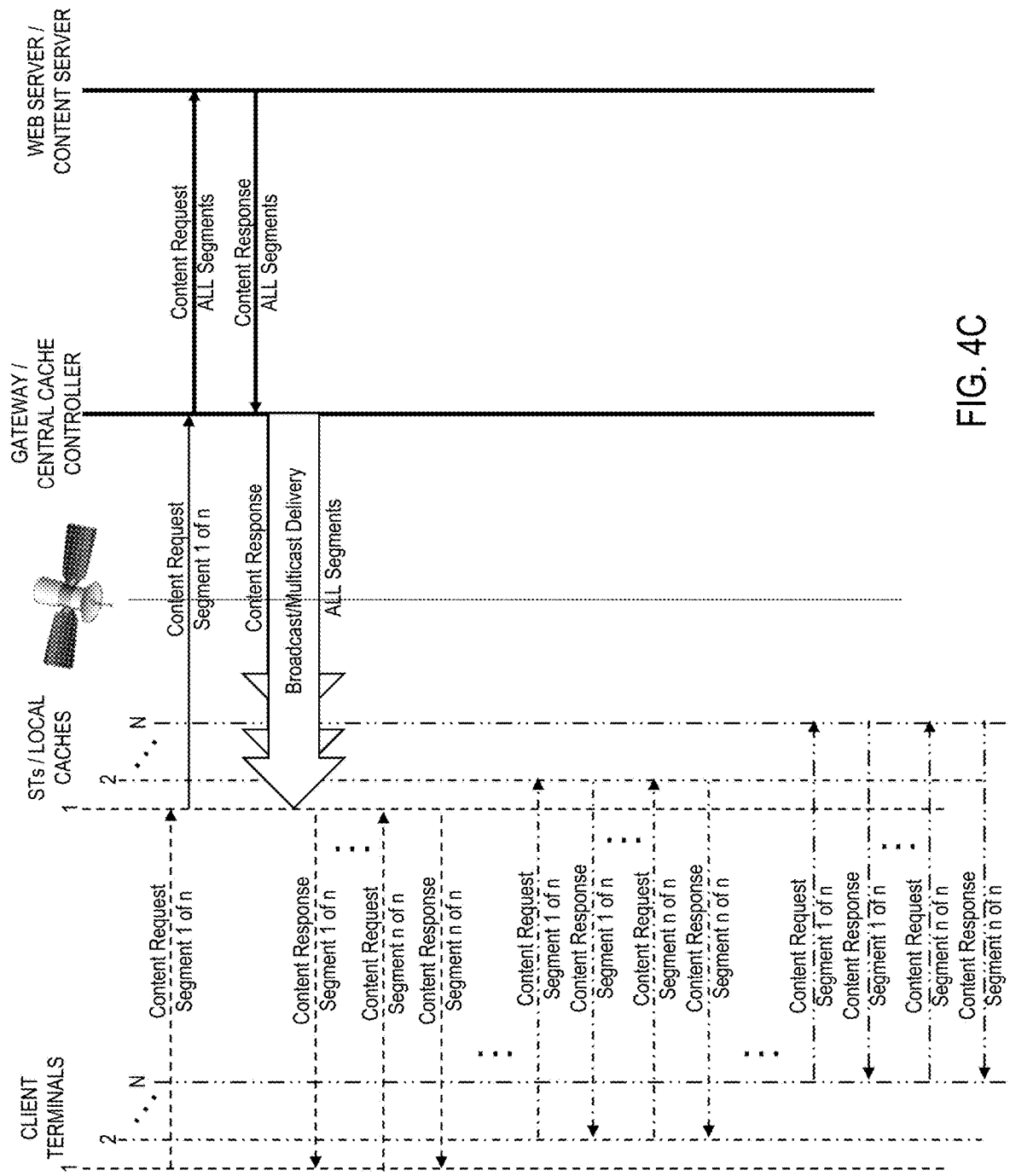
FIG. 4C illustrates a flow diagram of a process for a multi-segment content request, a prefetch content retrieval, and broadcast/multicast content delivery and opportunistic caching, in accordance with example embodiments.

FIG. 4C illustrates a flow diagram of a process for a multi-segment content request, a prefetch content retrieval, and broadcast/multicast content delivery and opportunistic caching, in accordance with example embodiments of the present invention. The scenario depicted FIG. 4C is similar to the scenario depicted in FIG. 4B, with the only difference being that, upon receiving the request for the first content segment from the requesting ST 1, the gateway prefetches the entire content title from the web server/content server. In that case, the gateway can then deliver the entire content title to the ST 1 prior to receiving requests for subsequent content segments. Alternatively, the gateway can store the entire content title in its local cache, and can service requests for subsequent content segments from the ST 1 from its local cache without having to retrieve the subsequent content segments from the web server/content server (note, this alternative is not depicted in the figure). In the case where the gateway broadcasts/multicasts the entire pre-fetched content title, each ST that receives the content makes the determination (based on its respective local cache management policies/criteria) to store the entire content title in its respective local cache. Subsequently, when any one of these STs receives a request for any of the segments of that content title, the cache controller that ST would be able to service the content request directly from its local cache, without having to retrieve the content from the remote web server/content server.

According to further example embodiments, a client terminal may cancel its content consumption after requesting the content. For the case of a single content request (e.g., as depicted in FIG. 4A), the local cache of the respective ST would not necessarily be aware of the cancellation, for example, until a TCP RST (TCP reset) is received. Upon receipt of the TCP RST, the cache controller of the ST would provide a notification to the gateway of the cancellation. In response to the cancellation notification, the central cache controller of the gateway may abort, but need not necessarily abort, its broadcast/multicast delivery of the content. Instead, according to one example embodiment, the gateway cache controller would be configured to make a determination (e.g., based on such factors as the relative popularity of the content and the amount of the content that has already been delivered) to continue the broadcast/multicast delivery of the content. In case where the gateway aborts the content delivery, the cache controller of the STs that have been receiving the content may flush the already received content from the respective local caches. In case where the gateway continues delivery of the content, the cache controller of the STs that have been receiving the content would continue to store the content in their respective local caches for servicing potential subsequent requests for the content.

For a content request cancellation in the case of multiple requests for content segments (e.g., as depicted in FIG. 4B), the content broadcast/multicast would delivered up to the current segment, which the client has requested up to the point of cancellation (even though the requesting client terminal may stop its consumption at the middle of delivery of the segment). When that client terminal (or another client terminal serviced by an ST that has cached the content) requests the same content in the future, the content will be served from the local cache up to the last segment that was delivered. For the remaining segments of the content, the request/response and caching functions continue as depicted in the figure. The gateway central cache controller would recognize that the segments are part of the content title it has partially delivered, and then may make the determination to broadcast/multicast subsequent segments (not previously delivered) to the respective STs.

For a content request cancellation in the case of multiple requests for content segments and a prefetch and broadcast/multicast delivery of the entire content title, the cache controller of the ST servicing the client terminal that made the initial content request may abort the continued storage of the content segments and its local cache and may notify the gateway of the content request cancellation. Alternatively, the cache controller may continue storing the subsequent content segments broadcast/multicast by the gateway (e.g., again based on cash management criteria such as the relative popularity of the content and the amount of content already received). Similarly, in the event that the requesting ST does not notify the gateway to terminate the broadcast/multicast transmission, the cash controllers of the further STs receiving the content would continue to store the content in their respective local caches. Subsequently, any future requests for the content would be serviced by the respective ST directly from its local cache, to the extent that the ST has the requested content stored therein.

In accordance with further example embodiments, the foregoing embodiments may be applied to a case where a client terminal submits content requests for a reservation of content for a specific future consumption time. In such a scenario, the content could still be delivered via broadcast/multicast delivery methods and opportunistic caching may be applied in accordance with such embodiments. Further, in the case of a reservation for future consumption, the system would have the luxury of servicing such a request at times when system resources are more readily available (e.g., during off-peak hours), provided that the content is ultimately delivered prior to the specific future consumption time of the reservation request. Moreover, at times when system resources are readily available, popular content can be delivered via broadcast/multicast and opportunistic caching, without being requested (e.g., in the case of a iOS software update or a Microsoft Windows software update).

Figure 5:
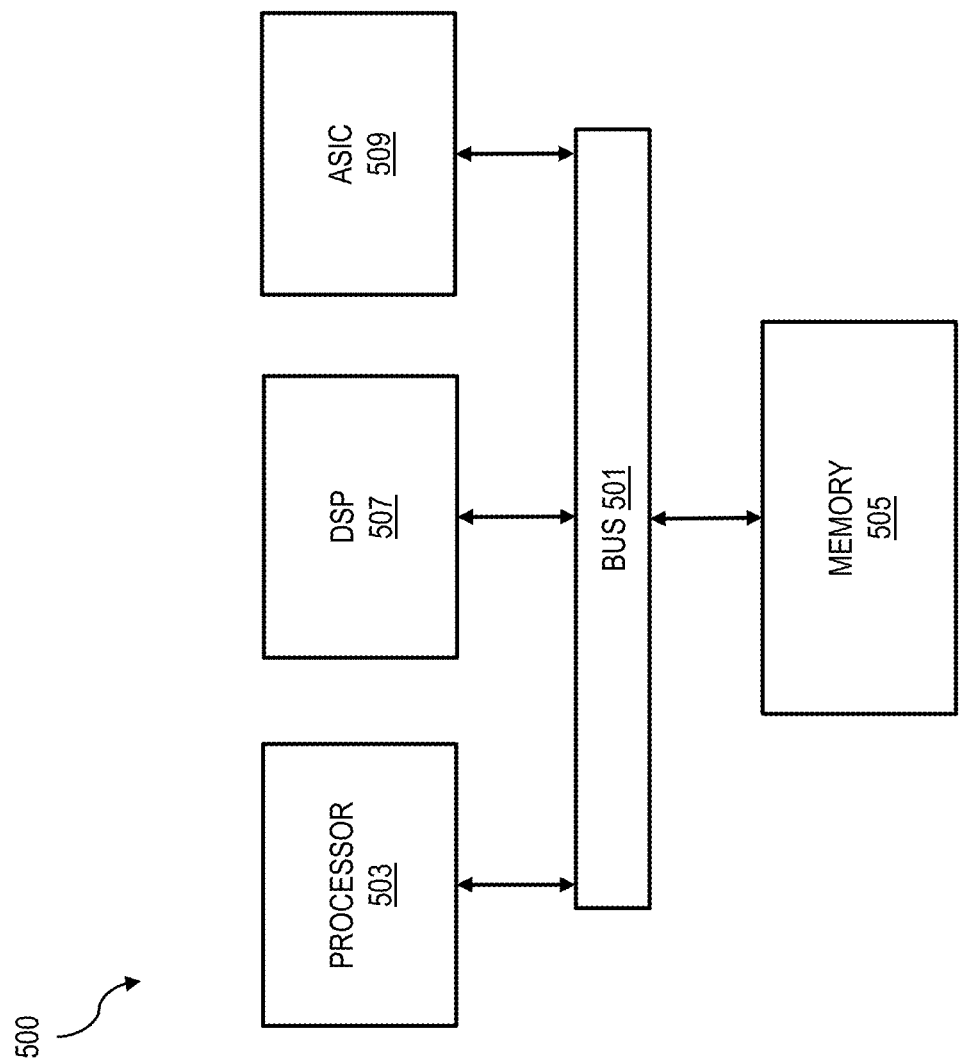
FIG. 5 illustrates a block diagram of a chip set implementing aspects of opportunistic caching approaches, in accordance with example embodiments.

FIG. 5 illustrates a block diagram of a chip set 500 implementing aspects of opportunistic caching approaches, in accordance with example embodiments of the present invention. Chip set 500 includes, for instance, processor and memory components incorporated in one or more physical packages. By way of example, a physical package includes an arrangement of one or more materials, components, and/or wires on a structural assembly (e.g., a baseboard or printed circuit board) to provide one or more characteristics such as physical strength, conservation of size, and/or limitation of electrical interaction.

In one embodiment, the chip set 500 includes a communication mechanism such as a bus 501 for passing information among the components of the chip set. A processor 503 has connectivity to the bus 501 to execute instructions/programs and process information stored in, for example, a memory 505. The processor may include one or more processing cores with each core configured to perform independently. A multi-core processor enables multiprocessing within a single physical package, such as two, four, eight, or greater numbers of processing cores. Alternatively or in addition, the processor may include one or more microprocessors configured in tandem via the bus to enable independent execution of instructions, pipelining, and multithreading. The processor may also be accompanied with one or more specialized components to perform certain processing functions and tasks such as one or more digital signal processors (DSP) 507, and/or one or more application-specific integrated circuits (ASIC) 509. A DSP typically is configured to process real-time signals (e.g., sound or video) in real time independently of the processor. Similarly, the ASIC can be configured to performed specialized functions not easily performed by a general purpose processor. Other specialized components to aid in performing the inventive functions described herein may include one or more field programmable gate arrays (FPGA) (not shown), one or more controllers (not shown), or one or more other special-purpose computer chips.

The processor 503 and accompanying components have connectivity to the memory 505 via the bus 501. The memory may include both dynamic memory (e.g., RAM) and static memory (e.g., ROM) for storing executable instructions that, when executed by the processor and/or the DSP 507 and/or the ASIC 509, perform the process of example embodiments as described herein. The memory may also store the data associated with or generated by the execution of the process.

Further, the functionality of the example embodiments of the present invention may be provided by the chip set 500, in response to the processor 503 executing an arrangement of program instructions contained in memory 505. Execution of the program instructions contained in memory causes the processor to perform the process steps and generate the results described herein, or equivalents thereof. One or more processors in a multi-processing arrangement can also be employed to execute the program instructions. In alternative embodiments, hard-wired circuitry can be used in place of or in combination with software instructions to implement the example embodiments. Thus, embodiments of the present invention are not limited to any specific combination of hardware circuitry and software.

Moreover, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Figure 6:
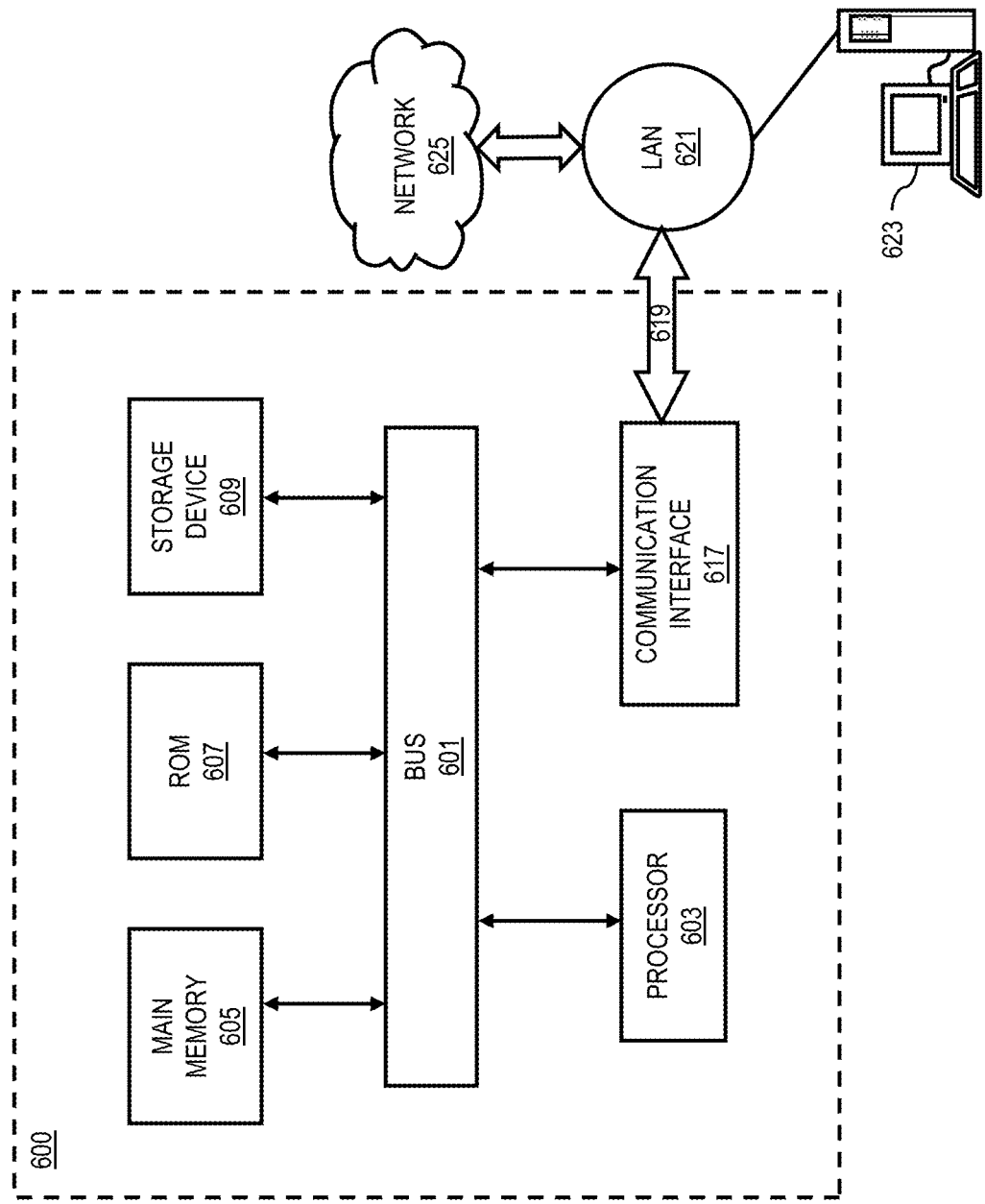
FIG. 6 illustrates a block diagram of a computer system implementing aspects of opportunistic caching approaches, in accordance with example embodiments.

FIG. 6 illustrates a block diagram of a computer system implementing aspects of opportunistic caching approaches, in accordance with example embodiments of the present invention. The computer system 600 includes a bus 601 or other communication mechanism for communicating information, and a processor 603 coupled to the bus for processing information. The computer system also includes main memory 605, such as a random access memory (RAM) or other dynamic storage device, coupled to the bus for storing information and instructions to be executed by the processor. Main memory can also be used for storing temporary variables or other intermediate information during execution of instructions to be executed by the processor. The computer system further includes a read only memory (ROM) 607 or other static storage device coupled to the bus for storing static information and instructions for the processor. A storage device 609, such as a magnetic disk or optical disk, is additionally coupled to the bus for storing information and instructions.

According to one embodiment of the invention, dynamic and flexible approaches for opportunistic caching, are provided by the computer system 600 in response to the processor 603 executing an arrangement of instructions contained in main memory 605. Such instructions can be read into main memory from another computer-readable medium, such as the storage device 609. Execution of the arrangement of instructions contained in main memory causes the processor to perform the process steps described herein. One or more processors in a multi-processing arrangement may also be employed to execute the instructions contained in main memory. In alternative embodiments, hard-wired circuitry is used in place of or in combination with software instructions to implement the embodiment of the present invention. Thus, embodiments of the present invention are not limited to any specific combination of hardware circuitry and software.

The computer system 600 also includes a communication interface 617 coupled to bus 601. By way of example, the communication interface provides a two-way data communication coupling to a network link 619 connected to a local network 621. The communication interface, for example, may be a digital subscriber line (DSL) card or modem, an integrated services digital network (ISDN) card, a cable modem, or other modem to provide a data communication connection to a corresponding type of telephone line. As another example, communication interface may be a local area network (LAN) card (e.g. for Ethernet™ or an Asynchronous Transfer Mode (ATM) network) to provide a data communication connection to a compatible LAN, or an optical modem configured to provide communications with a fiber-optic network link. Wireless links can also be implemented. Further, the communication interface, for example, includes peripheral interface devices, such as a Universal Serial Bus (USB) interface, a PCMCIA (Personal Computer Memory Card International Association) interface, etc.

The network link 619 typically provides data communication through one or more networks to other data devices. For example, the network link provides a connection through local network 621 to a host computer 623, which has connectivity to a network 625, such as a private wide area network (WAN) or a public WAN (e.g., the Internet), or to data equipment operated by service provider. The computer system 600 sends messages and receives data, including program code, through the network(s), via the network link 419 and the communication interface 617. In the Internet example, a server (not shown) might transmit requested code or content belonging to an application program or service for implementing an embodiment of the present invention via the network 625. The processor 603 executes the transmitted code while being received and/or store the code in storage device, or other non-volatile storage for later execution.

Additionally, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for opportunistic caching of streaming media content, the method comprising:

receiving, by a second communications terminal, a first content response transmitted by a gateway of a communications network and originating from a first content server, via a broadcast or multicast communications medium of the communications network, wherein the first content response was transmitted by the gateway in response to a first content request of a first client device associated with a first communications terminal and not associated with the second communications terminal, and wherein the first content response includes first data content requested by the first client device via the first communications terminal;

determining, by a cache controller of a local cache storage device associated with the second communications terminal, that the first data content of the first content response is relevant to at least one client device associated with the second communications terminal, wherein the determination is based on a relation between one or more criteria concerning the first data content and one or more factors concerning the at least one client device associated with the second communications terminal; and storing, by the cache controller of the local cache storage device associated with the second communications terminal, the first data content in the local cache storage device based on the determination that the first data content is relevant to the at least one client device associated with the second communications terminal, even though the first content response was transmitted in response to the to the first content request of the first client device which is not associated with the second communications terminal.

2. The method according to claim 1, wherein the first data content of the first content response comprises at least one segment of a sequence of segments of a data file requested by the first client device, via the first communications terminal, as part of a streaming data session of the first client device.

3. The method according to claim 2, wherein the streaming data session of the first client device comprises one of a streaming media data session and a streaming software download data session.

4. The method according to claim 2, further comprising:
receiving, by the second communications terminal, a plurality of further content responses transmitted by the gateway and originating from the first content server, via the broadcast or multicast communications medium, in response to respective further content requests of the first client device, wherein each further content response includes further data content comprising at least one subsequent segment of the sequence of segments of the data file requested by the first client device, via the first communications terminal, as part of the streaming data session of the first client device;
determining, by the cache controller of the local cache storage device associated with the second communications terminal, that the further data content of each of the further content responses is relevant to the at least one client device associated with the second communications terminal, wherein the determination is based on the relation between the one or more criteria concerning the first data content and the one or more factors concerning the at least one client device associated with the second communications terminal; and
storing, by the cache controller of the local cache storage device associated with the second communications terminal, the further data content in the local cache storage device based on the determination that the further data content is relevant to the at least one client device associated with the second communications terminal, even though the further content responses were transmitted in response to the to the further content requests of the first client device which is not associated with the second communications terminal.

5. The method according to claim 4, further comprising:
receiving, by the second communications terminal, a plurality second content requests of a second client device associated with the second communications terminal, wherein each second content request requests, from a server, data content comprising at least one segment of a sequence of segments of a data file requested by the second client device, via the second communications terminal, as part of a streaming data session of the second client device, and wherein the server is one of the first content server and a second content server;
determining, by the cache controller of the local cache storage device associated with the second communications terminal, that the data content requested by each of one or more of the second content requests is substantively equivalent to the further data content of a respective one of the further content responses stored in the local cache storage device associated with the second communications terminal; and
retrieving, from the local cache storage device associated with the second communications terminal, the further data content of the respective one of the further content responses that is determined as being substantively equivalent to the data content requested by each of the one or more second content requests, and providing each such further data content of the respective one of the further content responses to the second client as a content response in response to a respective one of the second content request.

6. The method according to claim 4, further comprising:
receiving, by the second communications terminal, a plurality second content requests of a second client device associated with the second communications terminal, wherein each second content request requests, from a server, data content comprising at least one segment of a sequence of segments of a data file requested by the second client device, via the second communications terminal, as part of a streaming data session of the second client device, and wherein the server is one of the first content server and a second content server;
determining, by the cache controller of the local cache storage device associated with the second communications terminal, that the data content requested by each of one or more of the second content requests is not substantively equivalent to any data content stored in the local cache storage device associated with the second communications terminal;
transmitting each of the one or more second content requests, for which the requested data content is determined as not being substantively equivalent to any data content stored in the local cache storage device associated with the second communications terminal, to the server, and receiving a respective second content response from the server in response to each of the second content requests transmitted thereto, wherein each such second content response includes the respective requested data content; and
providing each of the second content responses received from the server to the second client device in response to the respective second content request.

7. The method according to claim 1, wherein the cache controller and the local cache storage device are components of the second communications terminal.

8. The method according to claim 1, further comprising:
receiving, by the second communications terminal, a second content request of a second client device associated with the second communications terminal, the second content request requesting second data content from a server via the second communications terminal, wherein the server is one of the first content server and a second content server;
determining, by the cache controller of the local cache storage device associated with the second communications terminal, that the second data content requested by the second content request of the second client device is substantively equivalent to the first data content of the first content response stored in the local cache storage device associated with the second communications terminal; and
retrieving the first data content of the content response stored in the local cache storage device associated with the second communications terminal, and providing the first data content to the second client device as a second content response in response to the second content request.

9. The method according to claim 1, further comprising:
receiving, by the second communications terminal, a second content request of a second client device associated with the second communications terminal, the second content request requesting second data content from a server via the second communications terminal, wherein the server is one of the first content server and a second content server;
determining, by the cache controller of the local cache storage device associated with the second communications terminal, that the second data content requested by the second content request is not substantively equivalent any data content stored in the local cache storage device associated with the second communications terminal;

transmitting the second content request to the server, and receiving a second content response from the server in response to the second content request, wherein the second content response includes the requested second data content;

providing the second content response to the second client device in response to the second content request.

10. A communications terminal comprising:
a cache controller;
a cache storage device;
a client device interface;
a receiver device; and
a transmitter device; and
wherein the client device interface is configured to interface with a second client device associated with the communications terminal, wherein the receiver device is configured to receive a first content response transmitted by a gateway of a communications network and originating from a first content server, via a broadcast or multicast communications medium of the communications network, wherein the first content response was transmitted by the gateway in response to a first content request of a first client device associated with a further communications terminal and not associated with the communications terminal, and wherein the first content response includes first data content requested by the first client device via the further communications terminal, wherein the cache controller is configured to determine that the first data content of the first content response is relevant to the second client device, wherein the determination is based on a relation between one or more criteria concerning the first data content and one or more factors concerning the at least one client device associated with the second communications terminal, and wherein the cache controller is configured to store the first data content in the cache storage device based on the determination that the first data content is relevant to the second client device, even though the first content response was transmitted in response to the to the first content request of the first client device which is not associated with the communications terminal.

11. The communications terminal according to claim 10, wherein the first data content of the first content response comprises at least one segment of a sequence of segments of a data file requested by the first client device, via the other communications terminal, as part of a streaming data session of the first client device.

12. The communications terminal according to claim 11, wherein the streaming data session of the first client device comprises one of a streaming media data session and a streaming software download data session.

13. The communications terminal according to claim 11, wherein:
the receiver device is further configured to receive a plurality of further content responses transmitted by the gateway and originating from the first content server, via the broadcast or multicast communications medium, in response to respective further content requests of the first client device, wherein each further content response includes further data content comprising at least one subsequent segment of the sequence of segments of the data file requested by the first client device, via the other communications terminal, as part of the streaming data session of the first client device;

the cache controller is further configured to determine that the further data content of each of the further content responses is relevant to the at least one client device associated with the second communications terminal, wherein the determination is based on the relation between the one or more criteria concerning the first data content and the one or more respective factors concerning the at least one client device associated with the second communications terminal; and the cache controller is further configured to store the further data content in the cache storage device based on the determination that the further data content is relevant to the second client device, even though the further content responses were transmitted in response to the to the further content requests of the first client device which is not associated with the communications terminal.

14. The communications terminal according to claim 13, wherein:
the client device interface is further configured to receive a plurality second content requests of the second client device, wherein each second content request requests, from a server, data content comprising at least one segment of a sequence of segments of a data file requested by the second client device, via the communications terminal, as part of a streaming data session of the second client device, and wherein the server is one of the first content server and a second content server;

the cache controller is further configured to determine that the data content requested by each of one or more of the second content requests is substantively equivalent to the further data content of a respective one of the further content responses stored in the cache storage device, and to retrieve from the cache storage the further data content of the respective one of the further content responses that is determined as being substantively equivalent to the data content requested by each of the one or more second content requests;

the client device interface is further configured to provide each such further data content of the respective one of the further content responses to the second client as a content response in response to a respective one of the second content requests.

15. The communications terminal according to claim 13, wherein:
the client device interface is further configured to receive a plurality second content requests of a second client device, wherein each second content request requests, from a server, data content comprising at least one segment of a sequence of segments of a data file requested by the second client device, via the communications terminal, as part of a streaming data session of the second client device, and wherein the server is one of the first content server and a second content server;

the cache controller is further configured to determine that the data content requested by each of one or more of the second content requests is not substantively equivalent to any data content stored in the cache storage device associated with the second communications terminal;

the transmitter device is configured to transmit each of the one or more second content requests, for which the requested data content is determined as not being substantively equivalent to any data content stored in the cache storage device, to the server;

the receiver device if further configured to receive a respective second content response from the server in response to each of the second content requests transmitted thereto, wherein each such second content response includes the respective requested data content; and the client device interface is further configured to provide each of the second content responses received from the server to the second client device in response to the respective second content request.

16. The communications terminal according to claim 10, wherein:

the client device interface is further configured to receive a second content request of the second client device, the second content request requesting second data content from a server via the communications terminal, wherein the server is one of the first content server and a second content server;

the cache controller is further configured to determine that the second data content requested by the second content request of the second client device is substantively equivalent to the first data content of the first content response stored in the cache storage device, and to retrieve the first data content of the content response from the cache storage device; and the client device interface is further configured to provide the first data content to the second client device as a second content response in response to the second content request.

17. The communications terminal according to claim 10, wherein:

the client device interface is further configured to receive a second content request of the second client device, the second content request requesting second data content from a server via the communications terminal, wherein the server is one of the first content server and a second content server;

the cache controller is further configured to determine that the second data content requested by the second content request is not substantively equivalent any data content stored in the cache storage device;

the transmitter device is configured to transmit the second content request to the server, and the receiver device is further configured to receive a second content response from the server in response to the second content request, wherein the second content response includes the requested second data content; and the client device interface is further configured to provide the second content response to the second client device in response to the second content request.

* * * * *